(12) United States Patent
Matsumoto

(10) Patent No.: US 9,563,039 B2
(45) Date of Patent: Feb. 7, 2017

(54) LENS APPARATUS AND OPTICAL APPARATUS

(71) Applicant: CANON KABUSHIKI KAISHA, Tokyo (JP)

(72) Inventor: Toru Matsumoto, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/733,365

(22) Filed: Jun. 8, 2015

(65) Prior Publication Data

US 2015/0355434 A1    Dec. 10, 2015

(30) Foreign Application Priority Data

Jun. 9, 2014  (JP) .................................. 2014-118536

(51) Int. Cl.
*G02B 13/00*  (2006.01)
*G02B 7/10*   (2006.01)
*G02B 7/04*   (2006.01)

(52) U.S. Cl.
CPC .............. *G02B 13/009* (2013.01); *G02B 7/04* (2013.01); *G02B 7/10* (2013.01)

(58) Field of Classification Search
CPC ......... G02B 13/009; G02B 7/10; G02B 7/282; G02B 15/00; G02B 15/155; G02B 15/14; H04N 5/23296; G03B 5/00; G03B 5/02
USPC ....................................................... 348/357
See application file for complete search history.

(56) References Cited

U.S. PATENT DOCUMENTS

| 5,148,199 | A  | * | 9/1992  | Kohmoto ................. G02B 7/10 396/86 |
| 6,024,457 | A  | * | 2/2000  | Kawai ..................... G02B 7/102 359/601 |
| 7,625,140 | B2 | * | 12/2009 | Miya ...................... G03B 17/04 359/601 |
| 9,442,270 | B2 | * | 9/2016  | Araki ....................... G02B 7/10 |
| 2004/0156122 | A1 | * | 8/2004 | Nomura ................... G02B 7/10 359/694 |
| 2006/0083505 | A1 | * | 4/2006 | Kashiwaba ............. G02B 7/10 396/79 |

(Continued)

FOREIGN PATENT DOCUMENTS

JP    10170795 A      6/1998
JP    2003207709 A    7/2003

(Continued)

*Primary Examiner* — Pritham Prabhakher
(74) *Attorney, Agent, or Firm* — Rossi, Kimms & McDowell LLP

(57) ABSTRACT

The lens apparatus includes a first operating member rotatable around an optical axis of an optical element so as to move the optical element in an optical-axis direction, a first elastic member configured to press the first operating member, a second elastic member configured to press the first operating member, a second operating member rotatable around the optical axis and movable in the optical-axis direction, and a first interposition provided between the first operating member and the second operating member. When the second operating member is moved in the optical-axis direction, the first interposition is moved in the optical-axis direction without rotating around the optical axis and presses the first elastic member and the second elastic member.

25 Claims, 6 Drawing Sheets

(56) References Cited

U.S. PATENT DOCUMENTS

| | | | | |
|---|---|---|---|---|
| 2007/0127910 A1* | 6/2007 | Miya | ............... | G03B 17/04 |
| | | | | 396/349 |
| 2009/0225460 A1* | 9/2009 | Nomura | ............ | G02B 15/14 |
| | | | | 359/892 |
| 2012/0027394 A1* | 2/2012 | Mochizuki | ............ | G03B 3/10 |
| | | | | 396/133 |
| 2013/0271860 A1* | 10/2013 | Arakawa | ............ | G02B 7/04 |
| | | | | 359/823 |
| 2015/0016814 A1* | 1/2015 | Kuroiwa | ............ | G02B 7/14 |
| | | | | 396/530 |

FOREIGN PATENT DOCUMENTS

| | | |
|---|---|---|
| JP | 2008083557 A | 4/2008 |
| JP | 2009175484 A | 8/2009 |
| JP | 2013161062 A | 8/2013 |

* cited by examiner

LENS APPARATUS AND OPTICAL APPARATUS

BACKGROUND OF THE INVENTION

Field of the Invention

The present invention relates to a lens apparatus and an optical apparatus, and more particularly to a lens apparatus configured to adjust an operating force of an operating member.

Description of the Related Art

In a lens apparatus that provides zooming and focusing, an operating ring has resistance so as to provide a proper operating feel and to prevent an unintentional rotation of the operating ring.

Japanese Patent Laid-Open No. ("JP") 2008-83557 discloses a structure in which one end of a cantilever-shaped elastic member is fixed onto a barrel member, the free end thereof is pressed against an operating ring, and a support piece is movable between the barrel member and the elastic member. The support piece is provided to an adjusting ring, and as the adjusting ring is rotated, the support piece moves and the fulcrum of the cantilever-shaped elastic member is changed. This configuration changes a pressing force applied by the elastic member to the operating ring, and adjusts the operating force necessary for the operation of the operating ring.

JP 2003-207709 discloses a structure in which an annular leaf spring is inserted between a load adjusting ring and a zoom barrel and engaged with a linear groove in a fixed cylinder so that the annular leaf spring is movable in the optical-axis direction but is not rotatable. The load adjusting ring is moved back and forth in the optical-axis direction by rotating the load adjusting ring, and the operating force necessary to operate the operating ring is adjusted by changing a deforming amount of the annular leaf spring.

In order to increase the operating force necessary to operate the operating ring and to prevent an unintentional rotation of the operating ring, it is conventionally necessary to increase the pressing force of the elastic member. However, each of JPs 2008-83557 and 2007-207709 requires a moving amount of the adjusting ring to be larger so as to increase the pressing force of the elastic member, impeding a miniaturization demand. In an attempt to increase the pressing force of the elastic member without increasing the moving amount of the adjusting ring, an initial operating force needs to be stronger and it becomes difficult to provide a proper operating feel.

SUMMARY OF THE INVENTION

The present invention provides a lens apparatus and an optical apparatus, which are small and advantageous to an improvement of the operability of the operating ring.

A lens apparatus according to the present invention includes a first operating member rotatable around an optical axis of an optical element so as to move the optical element in an optical-axis direction, a first elastic member configured to press the first operating member, a second elastic member configured to press the first operating member, a second operating member rotatable around the optical axis and movable in the optical-axis direction, and a first interposition provided between the first operating member and the second operating member. When the second operating member is moved in the optical-axis direction, the first interposition is moved in the optical-axis direction without rotating around the optical axis and presses the first elastic member and the second elastic member.

Further features of the present invention will become apparent from the following description of exemplary embodiments with reference to the attached drawings.

DESCRIPTION OF THE EMBODIMENTS

A description will now be given of embodiments according to the present invention.

First Embodiment

Figure 1:
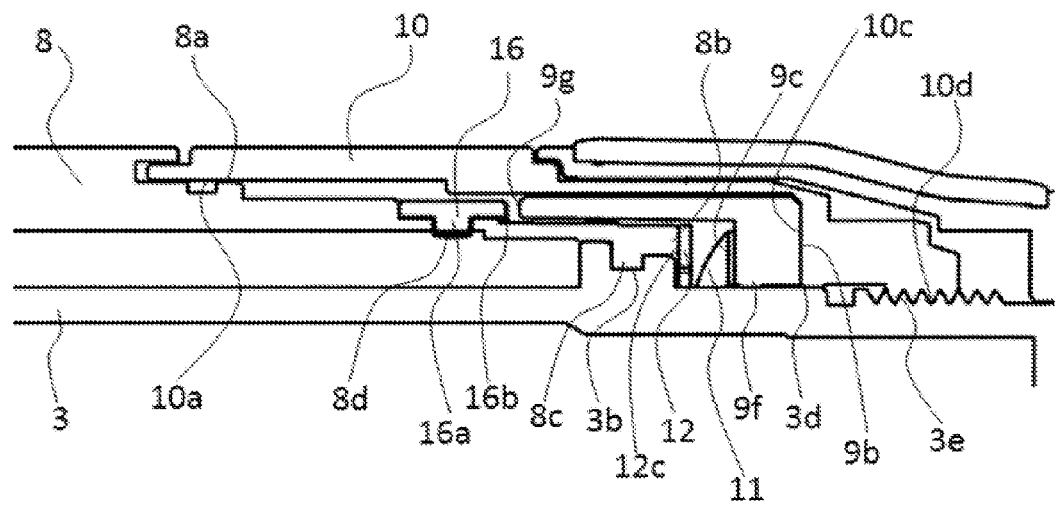
FIG. 1 is a partially enlarged sectional view of a lens barrel according to a first embodiment of the present invention.
Figure 2:
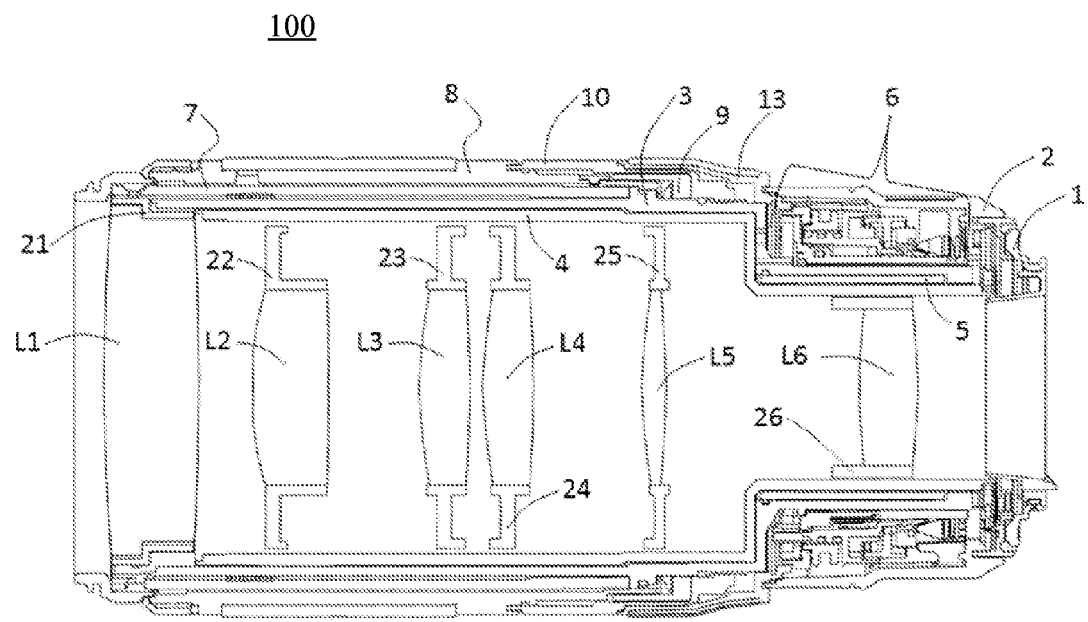
FIG. 2 is a sectional view of the lens barrel according to the first embodiment.
Figure 3:
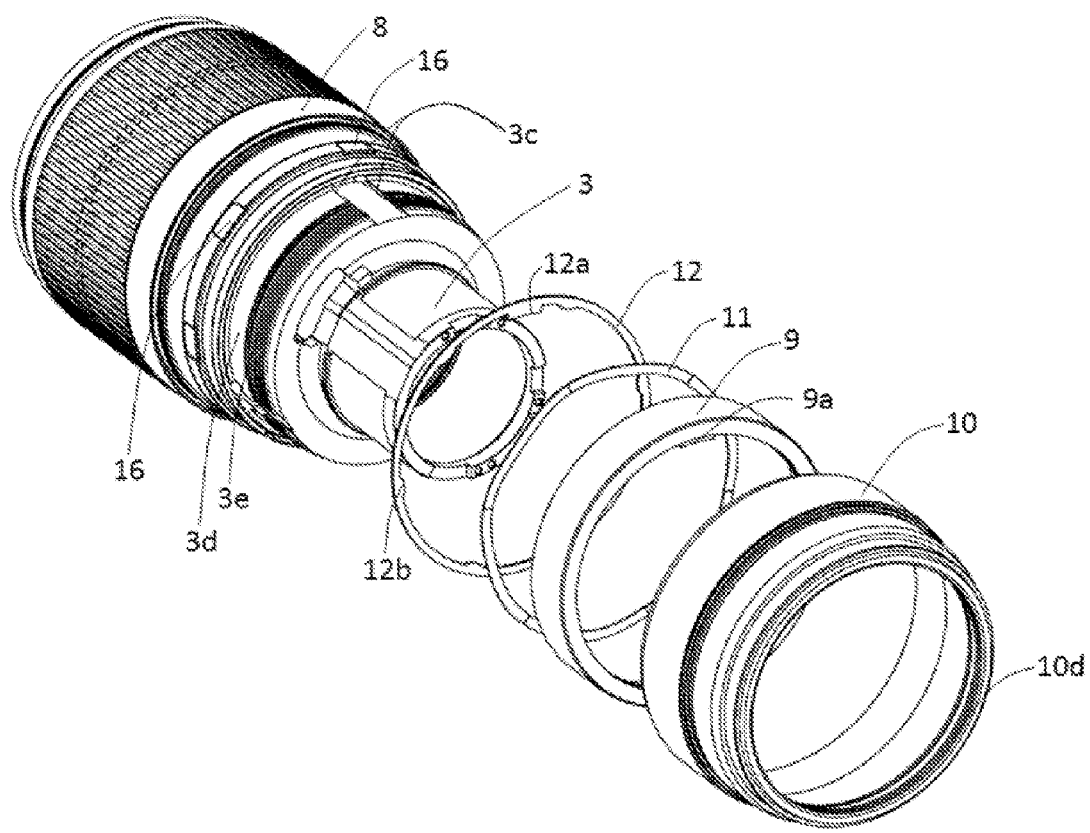
FIG. 3 is an exploded perspective view of the lens barrel according to the first embodiment.
Figure 4:
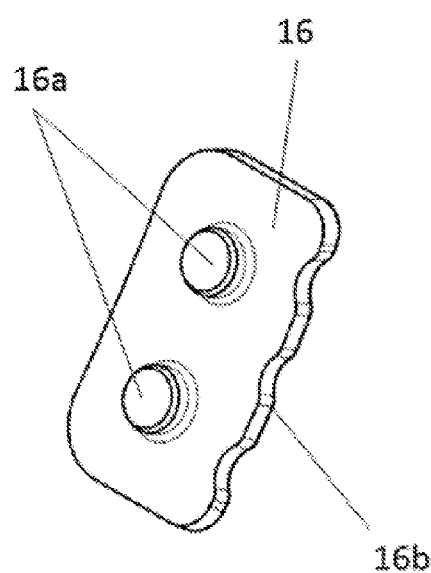
FIG. 4 is a perspective view of a zoom adjusting rubber in each embodiment of the present invention.

FIG. 2 illustrates a section of a lens barrel (lens apparatus) 100 according to a first embodiment of the present invention. FIG. 1 is a partially enlarged view of the lens barrel. FIG. 3 is an exploded view of the lens barrel. FIG. 4 is a perspective view of the zooming rubber.

In these figures, the lens barrel 100 houses (or supports) six lens units L1 to L6 in order from an object side to an image side (mount side). The image-pickup optical system forms an optical image of an object. The image-pickup optical system has a magnification varying (or zooming) function configured to change a focal length. In zooming, the first, third, and fourth, and six lens units L1, L3, L4, and L6 are moved in the optical-axis direction. In focusing, the sixth lens unit L6 is moved in the optical-axis direction.

The lens barrel 100 includes a fixed cylinder 2 as a body of the lens barrel, and a mount 1 provided to the rear end of the fixed cylinder 2 to be attached to and detached from a camera body (not illustrated), such as a single-lens reflex camera, an image-pickup apparatus, or an optical apparatus. The unillustrated camera body includes an image sensor configured to photoelectrically convert light that has passed the lens barrel, and thereby can capture an image through the lenses in the lens barrel.

The lens barrel 100 includes a guide cylinder (fixed member) 3. The guide cylinder 3 houses and holds the first, third, and fourth lens units L1, L3, and L4, and has three linear grooves (not illustrated) at regular intervals around the optical axis or in the circumferential direction, configured to guide these lens units in the optical-axis direction.

Reference numeral 4 denotes a cam cylinder. The cam cylinder 4 is provided on an inner circumference of the guide cylinder 3. The cam cylinder 4 has three cam grooves (not illustrated) at regular intervals in the circumferential direction so as to drive the first, third, fourth, and sixth lens units L1, L3, L4, and L6 in the optical-axis direction. When the cam cylinder 4 is rotated around the optical axis, the first, third, and fourth lens units L1, L3, and L4 are moved in the optical-axis direction while guided by the linear grooves in the guide cylinder 3. The sixth lens unit L6 is moved in the optical-axis direction while guided by the linear grooves in the focus rotating cylinder 5, which will be described later. Thereby, zooming is performed.

The second and fifth lens units L2 and L5 as the fixed lens units are provided on the inner circumference of the cam cylinder 4. These lens units are fixed onto the guide cylinder (fixed member) 3 via a second lens holder frame 22 and a fifth lens holder frame 25, respectively.

A holder cylinder 7 configured to hold the first lens unit L1 is arranged on the outer circumference of the guide cylinder 3. A first lens holder frame 21 provided on the holder cylinder 7 is engaged with the linear grooves in the guide cylinder 3 and the cam grooves in the cam cylinder 4. Thereby, the holder cylinder 7 is held movably in the optical-axis direction relative to the guide cylinder 3 while the holder cylinder 7 is not rotatable in the circumferential direction.

The third and fourth lens units L3 and L4 are arranged on the inner circumference of the cam cylinder 4, and a third lens holder frame 23 and a fourth lens holder frame 24 each configured to hold a corresponding one of the third and fourth lens units L3 and L4 are engaged with the linear grooves in the guide cylinder 3 and the cam grooves in the cam cylinder 4. Thereby, the third and fourth lens units L3 and L4 are movable in the optical-axis direction relative to the guide cylinder 3 but held non-rotatably.

Reference numeral 5 denotes a focus rotating cylinder. The focus rotating cylinder 5 has three linear grooves (not illustrated) at regular intervals in the circumferential direction, each of which extends in the optical-axis direction.

Reference numeral 6 is a focus motor unit. An output key (not illustrated) of the focus motor unit 6 is engaged with the focus rotating cylinder 5. A sixth lens holder frame 26 configured to hold the sixth lens unit L6 is engaged with the linear grooves in the focus rotating cylinder 5 and the cam grooves in the cam cylinder 4. When the focus motor unit 6 applies a rotating force to the focus rotating cylinder 5, the sixth lens unit L6 is moved in the optical-axis direction through the cam grooves in the cam cylinder 4 and thereby focusing is performed.

Reference numeral 8 denotes a zoom operating ring as a first operating member. The zoom operating ring 8 is arranged on the outer circumference of the guide cylinder 3. A bayonet tab 8c of the zoom operating ring 8 is bayonet-coupled with a circumferential groove 3b that is formed in the guide cylinder 3 and extends in the circumferential direction. Thereby, the zoom operating ring 8 is prevented from moving in the optical-axis direction and held by the guide cylinder 3 rotatably by a predetermined amount in the circumferential direction.

The zoom operating ring 8 is coupled with the cam cylinder 4 via an unillustrated coupling key. Hence, when the zoom operating ring 8 is rotated, the cam cylinder 4 is rotated by the same amount. The first, third, fourth, and sixth lens units L1, L3, L4, and L6 are thereby moved in the optical-axis direction so as to adjust a focal length. The zoom operating ring 8 is a first operating member configured to move the lens unit(s) (optical element(s)).

Reference numeral 9 denotes a linear movement ring (first interposition) as a linear movement member. An inner circumference 9f of the linear movement ring 9 is inserted into the outer circumference 3d of the guide cylinder 3, and projections 9a provided on the inner circumference side are engaged with the linear grooves 3c of the guide cylinder 3. Therefore, the linear movement ring 9 is held movably in the optical-axis direction while its rotation in the circumferential direction is prevented. The linear movement ring 9 prevents the zoom operating ring 8 from rotating in the rotating direction, as the zoom adjusting ring 10 is rotated, which will be described later. In other words, the zoom operating ring 8 is not rotated in the same rotating direction as that of the zoom adjusting ring 10.

Reference numeral 10 denotes a zoom adjusting ring (second operating member) that is rotatable around the optical axis of the optical element. The linear movement ring 9 (first interposition) is provided between the zoom adjusting ring 10 and the zoom operating ring 8 and movable in the optical-axis direction of the optical element when the zoom adjusting ring 10 is rotated. The zoom adjusting ring 10 is an adjuster configured to change, when rotated, the pressing force applied to the zoom operating ring 8 and the operating force necessary to rotate the zoom operating ring 8 (which will be referred to as a "necessary operating force" hereinafter).

An inner circumference 10a of the zoom adjusting ring 10 is engaged with the outer circumference 8a of the zoom operating ring 8, and a threaded part 10d provided on the inner circumference is engaged with a threaded part 3e provided on an outer circumference of the guide cylinder 3. Thereby, as the zoom adjusting ring 10 is rotated, the zoom adjusting ring 10 is moved in the optical-axis direction while it is rotating.

As illustrated in FIG. 1, a waved washer (first elastic member) 11 is arranged, as illustrated in FIG. 3, between an end surface (back end surface) 8b on the mount side of the zoom operating ring 8, and an optical-axis orthogonal surface 9c of the linear movement ring 9. A press ring 12 (second interposition) configured to stably transmit the pressing force of the waved washer 11 to the zoom operating ring 8 is arranged between the waved washer 11 and the zoom operating ring 8.

The inner circumference 12b of the press ring 12 is engaged with the outer circumferential plane 3d of the guide cylinder 3. A projection 12a provided on the inner circumference of the press ring 12 is engaged with the linear groove 3c of the guide cylinder 3. Thereby, the press ring 12 is held movably in the optical-axis direction while its rotation in the circumferential direction is prevented.

Figure 5:
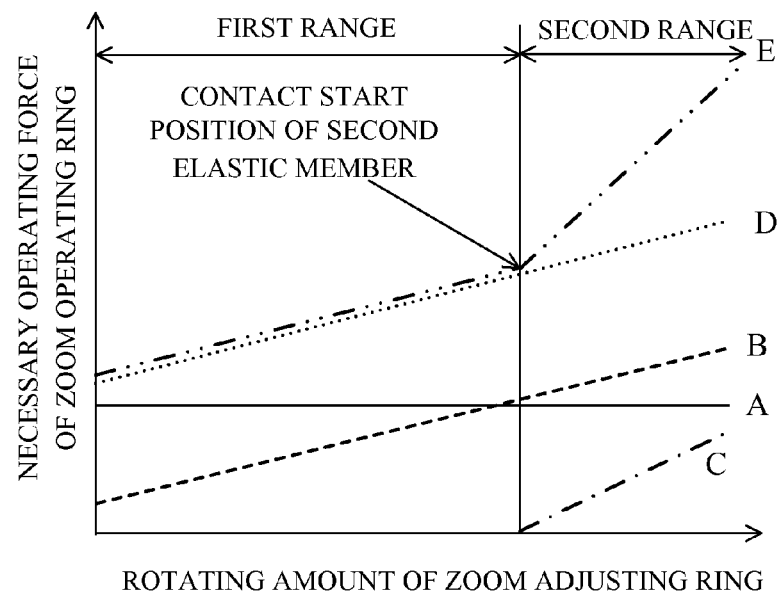
FIG. 5 is a view illustrating an illustrative operating force of a zoom (operating) ring in the lens barrel according to the first embodiment.

As illustrated in FIG. 1, the waved washer 11 forces the press ring 12 against the front side (the object side) in the optical-axis direction. This force always presses a front surface 12c of the press ring 12 against the back end surface 8b of the zoom operating ring 8. In other words, the waved washer 11 serves as a first elastic member configured to apply a pressing force to the zoom operating ring 8. This force always presses the back end surface 9b of the linear movement ring 9 against the end surface 10c of the zoom adjusting ring 10. The waved washer 11 is provided between the zoom operating ring 8 and the linear movement ring 9, and can press (as illustrated in FIG. 5 which will be described later) the zoom operating ring 8 in accordance with a moving amount of the zoom adjusting ring 10 (with the linear movement ring 9) in the optical-axis direction.

Reference numeral 13 denotes a focus (operating) ring 13. The focus operating ring 13 is engaged with the outer circumferential surface of the guide cylinder 3 and bayonet-coupled with the guide cylinder 3. The focus operating ring 13 is prevented from moving in the optical-axis direction and held in the circumferential direction. The end of the focus operating ring 13 is engaged with the part of the focus motor unit 6, and a rotation of the focus operating ring 13 can provide manual focusing.

Reference numeral 16 denotes a zoom adjusting rubber. The zoom adjusting rubber 16 has two projections 16a as illustrated in FIG. 4, which are engaged with and fixed in a pair of holes 8d in the zoom operating ring 8. Six sets of the two holes 8d of the zoom operating ring 8 and the zoom adjusting rubber 16 are provided at regular intervals in the circumferential direction.

The zoom adjusting rubber 16 has an undulating back end surface 16b as illustrated in FIG. 4. When the zoom adjusting ring 10 is rotated by a predetermined amount or more clockwise when it is viewed from the mount side, the end surface 9g of the linear movement ring 9 contacts the back end surface 16b of the zoom adjusting rubber 16. The zoom adjusting rubber 16 does not contact one of the zoom operating ring 8 and the linear movement ring 9 when a distance between the zoom operating ring 8 and the linear movement ring 9 is a predetermined amount or larger. When the distance between the zoom operating ring 8 and the linear movement ring 9 is equal to or smaller than the predetermined amount, the zoom adjusting rubber 16 contacts both of the zoom operating ring 8 and the linear movement ring 9. When the zoom adjusting rubber 16 contacts the end surface 9g of the linear movement ring 9 or receives a pressing force from the end surface 9g, the zoom adjusting rubber 16 can apply a pressing force to the zoom operating ring 8. The zoom adjusting rubber 16 is provided between the zoom operating ring 8 and the linear movement ring 9. As the linear movement ring 9 is moved in the optical-axis direction, the zoom adjusting rubber 16 contacts one of the zoom operating ring 8 and the linear movement ring 9 which one is provided with the zoom adjusting rubber 16 (or the zoom operating ring 8 in this embodiment), and then contacts both of the zoom operating ring 8 and the linear movement ring 9. In accordance with the moving amount by which the zoom adjusting ring 10 (with the linear movement ring 9) is moved in the optical-axis direction, the pressing force can be applied to the zoom operating ring 8.

The zoom adjusting ring 10 and the linear movement ring 9 (first interposition) are moved in the optical-axis direction of the optical element, and change the pressing forces of the waved washer 11 and the zoom adjusting rubber 16.

Referring now to FIGS. 1 and 5, a description will now be given of a method for adjusting an operating force of the zoom operating ring 8.

As the zoom adjusting ring 10 is rotated counterclockwise when it is viewed from the mount side, the zoom adjusting ring 10 is moved in a direction approaching to the zoom operating ring 8 in the optical-axis direction. Along with it, the linear movement ring 9 is also moved in a direction approaching to the zoom operating ring 8, and the compression amount of the waved washer 11 increases. When the compression amount of the waved washer 11 increases, the pressing force which the waved washer 11 applies to the press ring 12 to the object side increases. As a result, the pressing force applied by the front surface 12c of the compression ring 12 to the back end surface 8b of the zoom operating ring 8 also increases. This increased pressing force increases the frictional force between the front surface 12c of the press ring 12 and the back end surface 8b of the zoom operating ring 8, the frictional force between the bayonet tab 8c and the circumferential groove 3b of the guide cylinder 3, and the necessary operating force of the zoom operating ring 8. On the other hand, as the zoom adjusting ring 10 is rotated counterclockwise when it is viewed from the mount side, the necessary operating force of the zoom operating ring 8 decreases.

A line A in FIG. 5 represents an illustrative necessary operating force of the zoom operating ring 8 with no pressing force by the waved washer 11. A line B in FIG. 5 represents an illustrative necessary operating force of the zoom operating ring 8 where the pressing force of the waved washer 11 increases as the rotating amount of the zoom adjusting ring increases. A line D in FIG. 5 represents a resultant force of the line A and the line B.

As the zoom adjusting ring 10 is rotated clockwise by a predetermined amount when the zoom adjusting ring 10 is viewed from the mount side, the back end surface 16b of the zoom adjusting rubber 16 as the second elastic member contacts the end surface 9g of the linear movement ring 9 and the pressing force occurs. As a result, as illustrated by a line C in FIG. 5, a frictional force increases between the zoom adjusting rubber 16 and the linear movement ring 9 and the necessary operating force of the zoom operating ring 8 increases. As illustrated in FIG. 5, the zoom adjusting rubber 16 is configured to contact the zoom operating ring 8 and the linear movement ring 9 in a part of the movable range (under the rotating amount of the zoom adjusting ring) of the zoom adjusting ring 10 (with the linear movement ring 9). The movable range of the zoom adjusting ring 10 (with the linear movement ring 9) contains a first range in which the zoom adjusting rubber 16 does not contact the linear movement ring 9, and a second range in which the zoom adjusting rubber 16 contacts the linear movement ring 9. The first range is a range in which the waved washer 11 contacts the zoom operating ring 8 and the linear movement ring 9, and the zoom adjusting rubber 16 contacts only one of the zoom operating ring 8 and the linear movement ring 9. The second range is a range in which each of the waved washer 11 and the zoom adjusting rubber 16 contacts both of the zoom operating ring 8 and the linear movement ring 9.

A line E in FIG. 5 represents a resultant force of the lines A, B, and C, which is an illustrative necessary operating force of the zoom operating ring 8 according to this embodiment.

As understood from FIG. 5, due to the pressing force of the zoom adjusting rubber 16, the necessary operating force of the zoom operating ring 8 according to this embodiment becomes larger than that (D on FIG. 5) obtained only the waved washer 11 (the first elastic member). When the zoom adjusting rubber 16 contacts the linear movement ring 9, a variation amount of the necessary operating force is larger than that obtained only with the waved washer 11 and a user can recognize a lock state of the zoom operating ring 8.

This embodiment uses a plurality of zoom adjusting rubbers 16, and a contact position between the back end surface 16b of each zoom adjusting rubber 16 and the end surface 9g of the linear movement ring 9 may differ due to component manufacturing errors. As a result, the pressing force may significantly scatter for each individual at the contact start time. However, the back end surface 16b of the zoom adjusting rubber 16 has undulation in this embodiment, the back end surface 16b point-contacts the end surface 9g of the linear movement ring 9 at contact start time. As the rotating amount of the zoom adjusting ring 10 increases, a contact amount gradually increases. Thus, the pressing force of the zoom adjusting rubber 16 is less likely to scatter at the contact start time than that obtained when the back end surface 16b is flat.

The undulating back end surface 16b of the zoom adjusting rubber 16 as the second elastic member may serve as a grease repository in applying the grease etc., reducing wears, improving the durability, and assisting in applying a stable pressing force to the linear movement ring 9.

Since the necessary operating force of the zoom operating ring 8 changes as the zoom adjusting ring 10 is rotated, the user rotates the zoom adjusting ring 10 to a position at which he can obtain the necessary operating force suitable for the operability of the zoom operating ring 8. When the zoom adjusting ring 10 is rotated by a predetermined amount, the lock state can be made to prevent a malfunction (or unintentional rotation) of the zoom operating ring 8.

This embodiment provides the zoom adjusting rubber 16, and increases the necessary operating force of the zoom operating ring 8 without increasing the rotating amount and the moving amount in the optical-axis direction of the zoom operating ring. Therefore, this embodiment can reduce the size of the lens barrel. Only the operation of the zoom adjusting ring 10 (one member) can adjust the necessary operating force of the zoom operating ring 8 and set a malfunction preventive lock, improving the operability of the zoom operating ring 8. This embodiment can provide a lens apparatus and an optical apparatus, which are small, can adjust an operating force of the operating ring, and possesses a lock function for preventing the malfunction of the operating ring. This embodiment can provide a lens apparatus and an optical apparatus, which are small and advantageous to improved operability of a zoom operating ring.

Second Embodiment

FIGS. 6, 7, 8, and 9 illustrate, as a second embodiment of the present invention, a variation of a method for adjusting the necessary operating force of the zoom operating ring described in the first embodiment. Those elements in this embodiment, which are corresponding elements in the first embodiment, will be designated by the same reference numerals, and a description thereof will be omitted.

In this embodiment, information of a plurality of magnification variation states is put on a zoom operating ring 208 (first operating member), as described later. In addition, information of a plurality of operating force states is put on a zoom adjusting ring 210 (second operating member), as described later.

Reference numeral 209 denotes a linear movement ring (indicator unit or first interposition). The linear movement ring 209 has an indicator used to select one of the plurality of magnification variation states, and one of the plurality of operating force states. The inner circumference 209d of the linear movement ring 209 is engaged with an outer circumference 208a of the zoom operating ring 208, and the projection 209a (FIG. 7) provided on its inner circumference side is engaged with the linear groove 203c of the guide cylinder (fixed member) 203. Therefore, the linear movement ring 209 is held movably in the optical-axis direction while its rotation in the circumferential direction is prevented. The linear movement ring 209 prevents the zoom operating ring 208 from moving in the rotating direction along with the rotation of the zoom adjusting ring 210, which will be described later. In other words, the zoom operating ring 208 does not rotate in the same rotating direction as that of the zoom adjusting ring 210.

A bevel surface 209b is formed on the end on the mount side of the linear movement ring 209 in the optical-axis direction. The bevel surface 209b is formed so that its position (height) in the optical-axis direction continuously changes in the circumferential direction. More specifically, as understood from FIG. 7, the height of the bevel surface 209b on the mount side increases clockwise when it is viewed from the mount side. Three bevel surfaces 209b are formed on the end of the linear movement ring 209 on the mount side in the circumferential direction.

An inner circumference 210g of the zoom adjusting ring 210 is engaged with an outer circumferential surface 203d of the guide cylinder 203. Three projections 210i (FIG. 8) provided in the circumferential direction on the inner circumference of the zoom adjusting ring 210 are bayonet-coupled with circumferential grooves 203a formed in the circumferential direction of the guide cylinder 203. Therefore, the zoom adjusting ring 210 is held rotatably by a predetermined amount in the circumferential direction while it is prevented from moving in the optical-axis direction.

A bevel surface 210f is formed on part of a surface 210e (FIG. 8) orthogonal to the optical axis in the zoom adjusting ring 210. The bevel surface 210f is formed so that its position (height) in the optical-axis direction relative to the optical-axis orthogonal surface 210e continuously changes in the circumferential direction. More specifically, as understood from FIG. 8, the height of the bevel surface 210f on the object side increases clockwise when it is viewed from the object side (counterclockwise when it is viewed from the mount side). Three bevel surfaces 210f are formed in the circumferential direction. Each of the three bevel surfaces 210f contacts a corresponding one of the above three surfaces 209b of the linear movement ring 209.

A rotating amount of the zoom adjusting ring 210 is restricted in a predetermined range by a rotation stopper 215 fixed onto the guide cylinder 203 by a screw (not illustrated) and a notch 210j (FIG. 7) formed in the zoom adjusting ring 210.

A click spring 214 as a compression spring is screwed onto the outer circumference of the guide cylinder 203, and the tip of the clock spring 214 is engageable with concaves 210h-1 to 210h-4 of the zoom adjusting ring 210. Due to this structure, as the zoom adjusting ring 210 is rotated clockwise when it is viewed from the mount side, the tip of the click spring 214 comes out of the concave 210h-1 and becomes engaged with the concave 210h-2. When the zoom adjusting ring 210 is further rotated, the tip of the click spring 214 comes out of the concave 210h-2 and becomes engaged with the concave 210h-3, and then engaged with the concave 210h-4.

The click spring (third elastic member) may be fixed onto one of the guide cylinder (fixed member) 203 and the zoom adjusting ring 210. A plurality of concaves may be provided to the other of the guide cylinder 203 and the zoom adjusting ring 210, and may be engaged with the click spring and receive a force from the click spring. As a result, as the zoom adjusting ring 210 is rotated, a user can feel a click when the click spring is engaged with the concave.

This embodiment provides two click springs 214 at different phases, and prepares two sets of concaves 210h-1 to 4 in the zoom adjusting ring 210 each engageable with a corresponding one of the click springs 214. Only one click spring 214 may be provided, or three or more click spring 214 may be provided. In that case, the number of sets of corresponding concaves in the zoom adjusting ring 210 may be adjusted. Thereby, a user can feel a click when the zoom adjusting ring 210 is rotated, and the zoom adjusting ring 210 may be stably held at each rotating position.

Figure 9:
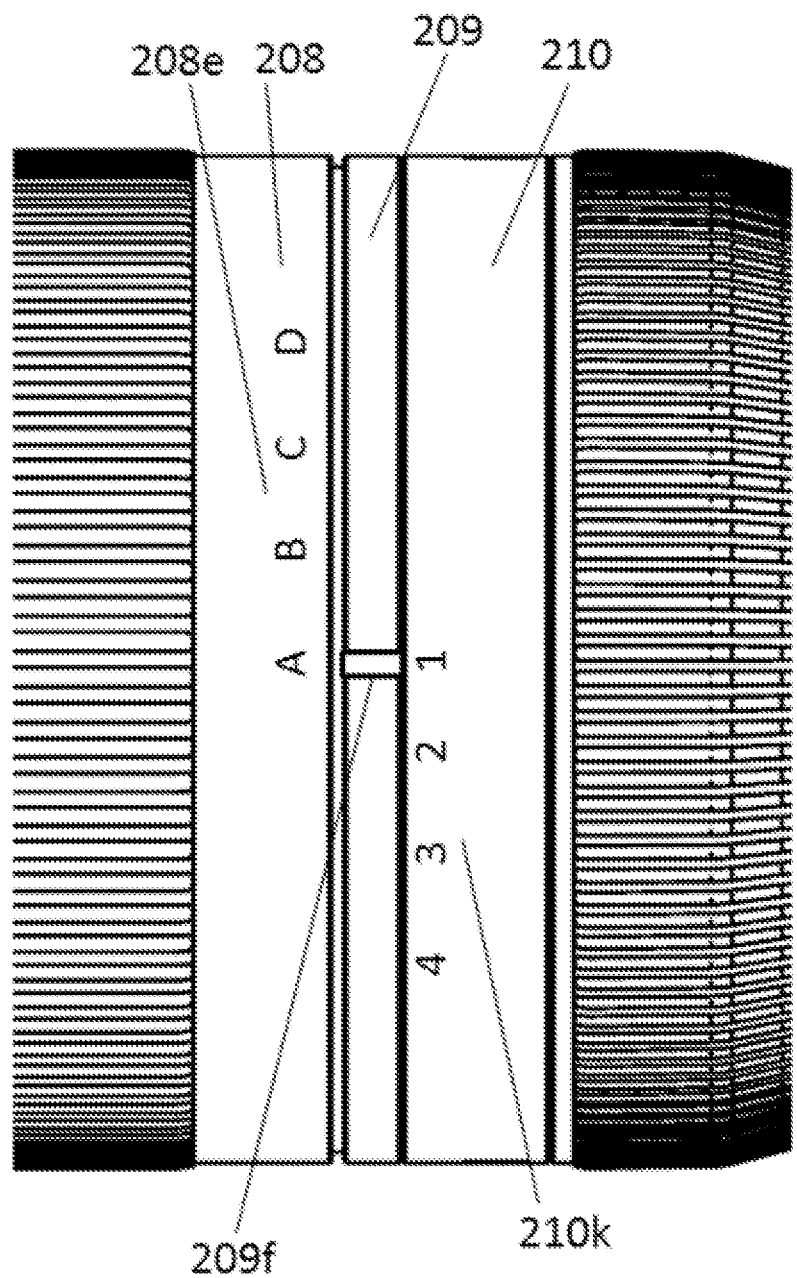
FIG. 9 is a partially enlarged view of the lens barrel according to the second embodiment.

FIG. 9 is a partially enlarged side view of the lens barrel, and illustrates a zoom scale 208e of the zoom operating ring 208, an indicator 209f of the linear movement ring 209, and an operating force scale 210k of the zoom adjusting ring 210. The zoom scale 208e of the zoom operating ring 208 represents a plurality of (four in this embodiment) magnification varying states (A, B, C, and D) which means corresponding focal length information put on the zoom operating ring 208. The indicator 209f of the linear movement ring 209 is an indicator used to select one of a plurality of magnification varying states, and the zoom scale 208e selected by the indicator 209f is the current focal length state, which is the state A in FIG. 9. This configuration identifies the current focal length state and improves the operability.

The operating force scale 210k of the zoom adjusting ring 210 represents a plurality of (four in this embodiment) states (1, 2, 3, and 4) of a necessary operating force of the zoom operating ring 208. As the number increases, the necessary operating force increases. The indicator 209f of the linear movement ring 209 also serves as an indicator used to select one of a plurality of necessary operating forces of the zoom operating ring 208, and the operating force scale 210k selected by the indicator 209f is the current necessary operating force of the zoom operating ring 208, which is the state 1 in FIG. 9. When the operating force scale 210k selected by the indicator 209f of the linear movement ring 209 is 1, the click spring 214 is engaged with the concave 210h-1 of the zoom adjusting ring 210. When the operating force scale 210k is 2, the click spring 214 is engaged with the concave 210h-2. When the operating force scale 210k is 3, the click spring 214 is engaged with the concave 210h-3. When the operating force scale 210k is 4, the click spring 214 is engaged with the concave 210h-4. Since the target necessary operating force of the zoom operating ring 8 can be easily set, the operability improves.

Wherever the zoom adjusting ring 210 is located in the states 1 to 4, the linear movement ring 209 is restricted from moving in the optical-axis direction, and thus the indicator 209f can always indicate the correct focal length state of the zoom operating ring 208. Since the linear movement ring 209 is provided between the zoom operating ring 208 and the zoom adjusting ring 210, the indicator 209f of the linear movement ring 209 can indicate the zoom scale 208e put on the zoom operating ring 208.

Figure 6:
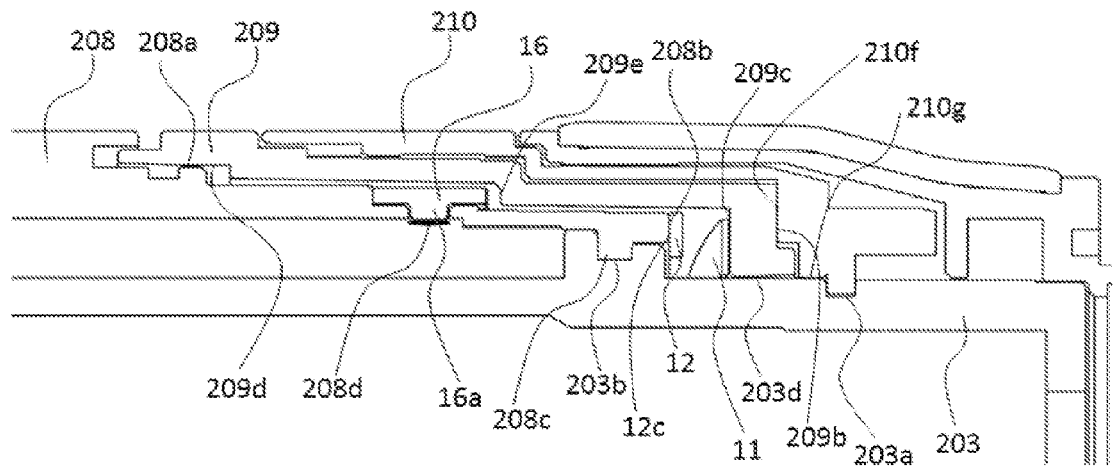
FIG. 6 is a partially enlarged sectional view of a lens barrel according to a second embodiment of the present invention.
Figure 7:
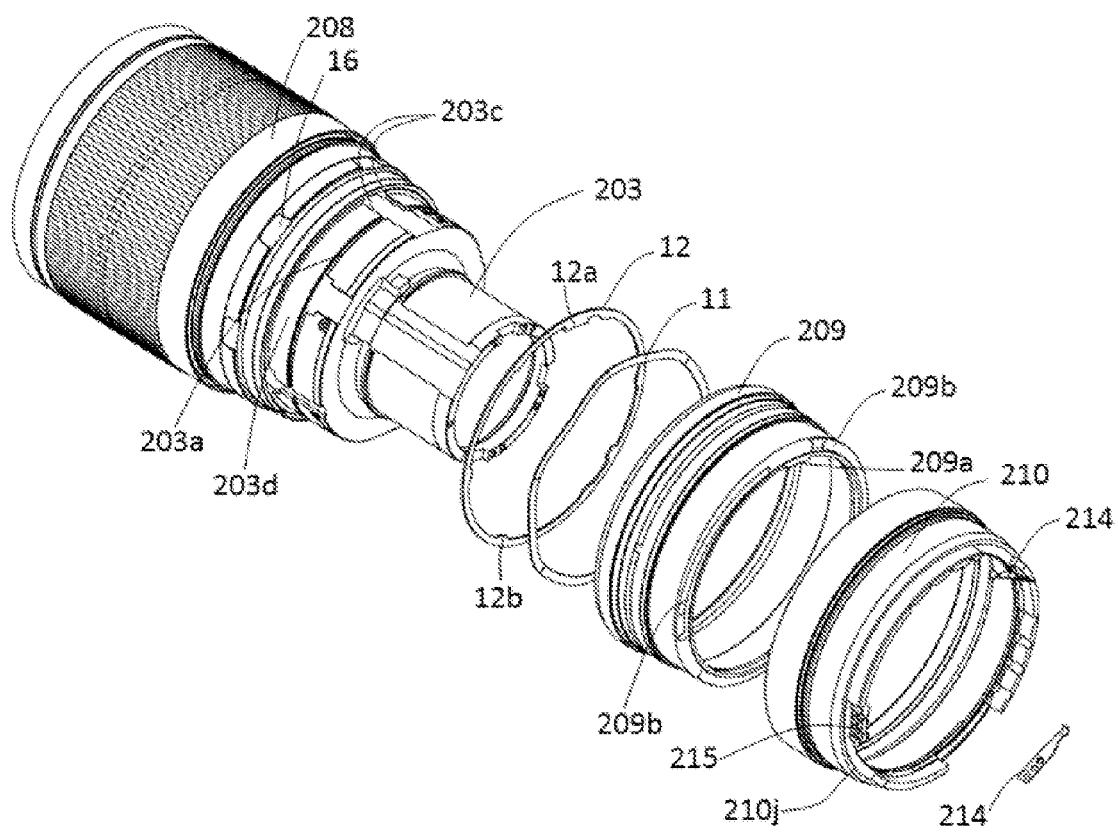
FIG. 7 is an enlarged perspective view of a lens barrel according to the second embodiment.
Figure 8:
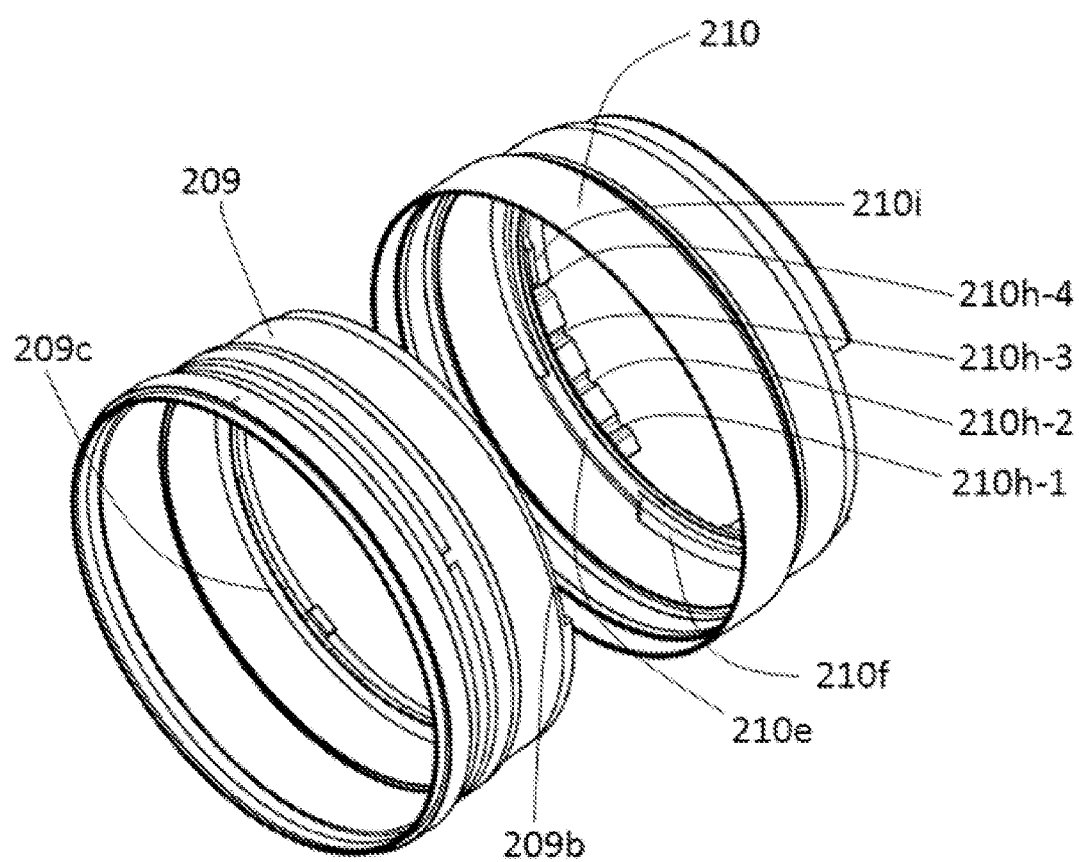
FIG. 8 is an exploded perspective view of a linear movement ring and a zoom adjusting ring in the lens barrel according to the second embodiment.

Referring now to FIGS. 6 and 9, a description will be given of a method for adjusting an operating force of the zoom operating ring 208. The press ring 12 (second interposition) and the waved washer 11 (first elastic member) are arranged between the back end surface 208b on the mount side of the zoom operating ring 208 and the optical-axis orthogonal surface 209c of the linear movement ring 209. As illustrated in FIG. 6, the waved washer 11 is sandwiched between the press ring 12 and the linear movement ring 209, and always compressed. Thus, the linear movement ring 209 is always forced against the mount side, and the bevel surface 209b of the linear movement ring 209 and the bevel surface 210f of the zoom adjusting ring 210 are always adhered closely to each other.

When the rotating position of the zoom adjusting ring 210 is the position (state 1) illustrated in FIG. 9, the linear movement ring 209 is closest to the zoom adjusting ring 210 in the optical-axis direction due to the contact relationship between the bevel surface 209b of the linear movement ring 209 and the bevel surface 210f of the zoom adjusting ring 210 in the circumferential direction. In other words, the linear movement ring 209 is closest to the mount side, and a compression amount of the waved washer 11 held between the press ring 12 and the linear movement ring 209 becomes smallest.

As the zoom adjusting ring 210 is rotated clockwise when it is viewed from mount side (in a direction from the state 1 to the state 4 in FIG. 9), the linear movement ring 209 moves in a direction separating from the zoom adjusting ring 210 in the optical-axis direction and thus the compression amount of the waved washer 11 increases. As the compression amount of the waved washer 11 increases, the force which the waved washer 11 applies to the press ring 12 on the object side increases. As a result, a pressing force increases which the front surface 12c of the press ring 12 applies to the back end surface 208b of the zoom operating ring 208. This increased pressing force increases the frictional force between the front surface 12c of the press ring 12 and the back end surface 208b of the zoom operating ring 208, the frictional force between the bayonet tab 208c and the circumferential groove 203b of the guide cylinder 203, and consequently the necessary operating force of the zoom operating ring 208. On the other hand, as the zoom adjusting ring 210 is rotated counterclockwise when it is viewed from the mount side (in a direction from the state 4 to the state 1 in FIG. 9), the necessary operating force of the zoom operating force of the zoom operating ring 208 decreases.

When the zoom adjusting ring 210 is rotated to the state 4 in FIG. 9, the back end surface 16b of the zoom adjusting rubber 16 (second elastic member) contacts the end surface 209e of the linear movement ring 209 and the pressing force takes place. This configuration consequently increases the frictional force between the zoom adjusting rubber 16 and the linear movement ring 209 and the necessary operating force of the zoom operating ring 208. Thereby, even when the moving amount of the linear movement ring 209 is the same, the necessary operating force of the zoom operating ring 208 becomes larger than that obtained only with the waved washer 11 as the first elastic member. Moreover, when the zoom adjusting rubber 16 starts contacting the linear movement ring 209, a variation amount of the necessary operating force increases and the user can recognize the lock state of the zoom operating ring 208. The zoom adjusting rubber 16 has two projections 16a, which are engaged with and fixed into the two holes 208d in the zoom operating ring 208.

Since the necessary operating force of the zoom operating ring 208 can be varied by rotating the zoom adjusting ring 210, the user can rotate the zoom adjusting ring 210 to a position at which he can obtain the necessary operating force corresponding to the desired operability of the zoom operating ring 208. The lock state is formed to prevent a malfunction of the zoom operating ring 208 by rotating the zoom adjusting ring 210 to the state 4 in FIG. 9.

This embodiment provides the zoom adjusting rubber 16, and can increase the necessary operating force of the zoom operating ring 208 without increasing the rotating amount and the moving amount in the optical-axis direction of the zoom operating ring 208, making the lens barrel smaller. Only the operation of the zoom adjusting ring 210 can adjust the necessary operating force of the zoom operating ring 208 and provides a malfunction preventive lock, improving the operability of the zoom operating ring 208. Since the linear movement ring 209 has the indicator 209f, the zoom operating ring 208 has the zoom scale 208e, and the zoom adjusting ring 210 has the operating force scale 210k, the operability improves. Thus, similar to the first embodiment, even this embodiment can provide a lens apparatus and an optical apparatus, which are small and advantageous to the improved operability of the zoom operating ring.

While this embodiment provides a contact with the zoom adjusting rubber by rotating the zoom adjusting ring 210 to the state 4, the contact may be provided with the state 2 or 3, as long as the second elastic member may not apply a pressing force to the zoom operating ring 208 in the movable range of the zoom adjusting ring 210.

While this embodiment sets four types or states 1 to 4 as positions at which the user feels clicks when the zoom adjusting ring 210 is rotated, the number of types may not be limited. For example, a click may be felt only at a position (state 1) where the operating force is lightest, and a position (state 4) where the operating force is strongest. In that case, a proper necessary operating force of the zoom operating ring 208 can be obtained by moving the zoom adjusting ring 210 to an arbitrary rotating position even in the range in which the click is not felt.

While each embodiment selects the waved washer 11 as the first elastic member, the friction clutch may serve as the first elastic member, as long as the pressing force applied to the zoom operating ring is varied by rotating the zoom adjusting ring.

While each embodiment uses the rubber as the second elastic member, the leaf spring and the waved washer may serve as the second elastic member as long as the second elastic member elastically deforms and the pressing force applied to the zoom operating ring is varied.

While each embodiment provides six zoom adjusting rubbers in the circumferential directions, at least one zoom adjusting rubber or more than six zoom adjusting rubbers may be provided. A plurality of zoom adjusting rubbers may be provided at regular intervals.

While each embodiment provides the zoom operating ring with the zoom adjusting rubber 16 as the second elastic member, the zoom adjusting rubber 16 may be provided on the end surface 9g of the linear movement ring 9 or the end surface 209e of the linear movement ring 209, for example. In this case, the zoom adjusting rubber 16 does not contact the zoom operating ring before the contact start position of the second elastic member illustrated in FIG. 5, and contacts the zoom operating ring after the contact start position of the second elastic member. In addition, the undulation of the zoom adjusting rubber 16 illustrated in FIG. 4 is provided on its contact surface with the zoom operating ring.

Each of the above embodiments has described a mechanism for adjusting the operating force of the zoom operating ring, but this embodiment is applicable to the focus operating ring so as to adjust the operating force of the focus operating ring.

While each embodiment discusses a lens barrel, the present invention is applicable to a lens integrated image-pickup apparatus and another optical apparatus.

Each embodiment can provide a lens apparatus and an optical apparatus, which are small and advantageous to an improvement of the operability of the operating ring.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-118536, filed on Jun. 9, 2014, which is hereby incorporated by reference herein in its entirety.

What is claimed is:

1. A lens apparatus comprising:
   a first operating member rotatable around an optical axis of an optical element so as to move the optical element in an optical-axis direction;
   a first elastic member configured to press the first operating member;
   a second elastic member configured to press the first operating member;
   a second operating member rotatable around the optical axis and movable in the optical-axis direction; and
   a first interposition provided between the first operating member and the second operating member,
   wherein when the second operating member is moved in the optical-axis direction, the first interposition is moved in the optical-axis direction without rotating around the optical axis and presses the first elastic member and the second elastic member.

2. The lens apparatus according to claim 1, wherein the second elastic member contacts the first operating member and the first interposition in a part of a movable range of the first interposition.

3. The lens apparatus according to claim 1, wherein the second elastic member does not contact one of the first operating member and the first interposition when a distance between the first operating member and the first interposition is a predetermined amount or larger, and the second elastic member contacts both of the first operating member and the first interposition when the distance between the first operating member and the first interposition is smaller than the predetermined amount.

4. The lens apparatus according to claim 1, wherein the first elastic member is provided between the first operating member and the first interposition, and presses the first operating member according to a moving amount by which the first interposition is moved in the optical-axis direction, and
   wherein the second elastic member is provided between the first operating member and the first interposition, and contacts one or both of the first operating member and the first interposition as the first interposition is moved in the optical-axis direction, the second elastic member pressing the first operating member according to a moving amount by which the first interposition is moved in the optical-axis direction.

5. The lens apparatus according to claim 1, wherein the second elastic member has an undulating surface that is to contact the first operating member or the first interposition.

6. The lens apparatus according to claim 1, wherein information on a plurality of states is put on the first operating member, and the first interposition is an indicator unit provided with an indicator used to select one of the states.

7. The lens apparatus according to claim 1, wherein information on a plurality of states of an operating force is put on the second operating member, and the first interposition is an indicator unit provided with an indicator used to select one of the states.

8. The lens apparatus according to claim 1, further comprising:
   a fixed member provided on an inner circumference side of each of the first operating member and the second operating member, and configured to house the optical element;
   a third elastic member provided on one of the fixed member and the second operating member; and
   a plurality of concaves provided on the other of the fixed member and the second operating member, wherein when the second operating member is operated, the third elastic member is engaged with the concaves and provides a click feel.

9. The lens apparatus according to claim 1, wherein when the second operating member is moved in the optical-axis direction, the first interposition is moved in the optical-axis direction without rotating around the optical axis and contacts the first elastic member and the second elastic member.

10. A lens apparatus comprising:
a first operating member rotatable around an optical axis of an optical element so as to move the optical element in an optical-axis direction;
a first elastic member configured to press the first operating member;
a second elastic member configured to press the first operating member;
a second operating member rotatable around the optical axis and movable in the optical-axis direction; a first interposition provided between the first operating member and the second operating member;
and
a second interposition provided between the first operating member and the first elastic member;
wherein when the second operating member is moved in the optical-axis direction, the first interposition is moved in the optical-axis direction without rotating around the optical axis and presses the second operating member, and
wherein when the second operating member is moved in the optical-axis direction, the first elastic member is pressed and the second interposition is moved in the optical-axis direction without rotating around the optical axis and presses the first operating member.

11. The lens apparatus according to claim 10, wherein when the second operating member is moved in the optical-axis direction, the first interposition is moved in the optical-axis direction without rotating around the optical axis and contacts the second elastic member, and
wherein when the second operating member is moved in the optical-axis direction, the first elastic member is pressed and the second interposition is moved in the optical-axis direction without rotating around the optical axis and contacts the first operating member.

12. An optical apparatus comprising:
a lens apparatus; and
an image sensor configured to photoelectrically convert light that has passed the lens apparatus,
wherein the lens apparatus includes:
a first operating member rotatable around an optical axis of an optical element so as to move the optical element in an optical-axis direction;
a first elastic member configured to press the first operating member;
a second elastic member configured to press the first operating member;
a second operating member rotatable around the optical axis and movable in the optical-axis direction; and
a first interposition provided between the first operating member and the second operating member,
wherein when the second operating member is moved in the optical-axis direction, the first interposition is moved in the optical-axis direction without rotating around the optical axis and presses the first elastic member and the second elastic member.

13. An optical apparatus comprising:
a lens apparatus; and
an image sensor configured to photoelectrically convert light that has passed the lens apparatus,
wherein the lens apparatus includes:
a first operating member rotatable around an optical axis of an optical element so as to move the optical element in an optical-axis direction;
a first elastic member configured to press the first operating member;
a second elastic member configured to press the first operating member;
a second operating member rotatable around the optical axis and movable in the optical-axis direction; a first interposition provided between the first operating member and the second operating member; and
a second interposition provided between the first operating member and the first elastic member;
wherein when the second operating member is moved in the optical-axis direction, the first interposition is moved in the optical-axis direction without rotating around the optical axis and presses the second operating member, and
wherein when the second operating member is moved in the optical-axis direction, the first elastic member is pressed and the second interposition is moved in the optical-axis direction without rotating around the optical axis and presses the first operating member.

14. A lens apparatus comprising:
a first operating member rotatable around an optical axis of an optical element so as to move the optical element in an optical-axis direction;
a first elastic member configured to press the first operating member;
a second elastic member configured to press the first operating member;
a second operating member rotatable around the optical axis; and
a first interposition provided between the first operating member and the second operating member,
wherein when the second operating member is rotated around the optical axis, the first interposition is moved in the optical-axis direction without rotating around the optical axis and presses the first elastic member and the second elastic member.

15. The lens apparatus according to claim 14, wherein the second elastic member contacts the first operating member and the first interposition in a part of a movable range of the first interposition.

16. The lens apparatus according to claim 14, wherein the second elastic member does not contact one of the first operating member and the first interposition when a distance between the first operating member and the first interposition is a predetermined amount or larger, and the second elastic member contacts both of the first operating member and the first interposition when the distance between the first operating member and the first interposition is smaller than the predetermined amount.

17. The lens apparatus according to claim 14, wherein the first elastic member is provided between the first operating member and the first interposition, and presses the first operating member according to a moving amount by which the first interposition is moved in the optical-axis direction, and
wherein the second elastic member is provided between the first operating member and the first interposition, and contacts one or both of the first operating member and the first interposition as the first interposition is moved in the optical-axis direction, the second elastic member pressing the first operating member according to a moving amount by which the first interposition is moved in the optical-axis direction.

18. The lens apparatus according to claim 14, wherein the second elastic member has an undulating surface that is to contact the first operating member or the first interposition.

19. The lens apparatus according to claim 14, wherein information on a plurality of states is put on the first operating member, and the first interposition is an indicator unit provided with an indicator used to select one of the states.

20. The lens apparatus according to claim 14, wherein information on a plurality of states of an operating force is put on the second operating member, and the first interposition is an indicator unit provided with an indicator used to select one of the states.

21. The lens apparatus according to claim 14, further comprising:
a fixed member provided on an inner circumference side of each of the first operating member and the second operating member, and configured to house the optical element;
a third elastic member provided on one of the fixed member and the second operating member; and
a plurality of concaves provided on the other of the fixed member and the second operating member,
wherein when the second operating member is operated, the third elastic member is engaged with the concaves and provides a click feel.

22. The lens apparatus according to claim 14, wherein when the second operating member is rotated around the optical axis, the first interposition contacts the first elastic member and the second elastic member.

23. The lens apparatus according to claim 14, further comprising:

a second interposition provided between the first operating member and the first elastic member,
wherein when the second operating member is rotated around the optical axis, the second interposition is moved in the optical-axis direction without rotating around the optical axis and presses the first operating member.

24. The lens apparatus according to claim 23, wherein when the second operating member is rotated around the optical axis, the first interposition contacts the second elastic member, and
wherein when the second operating member is rotated around the optical axis, the second interposition contacts the first operating member.

25. An optical apparatus comprising:
a lens apparatus; and
an image sensor configured to photoelectrically convert light that has passed the lens apparatus,
wherein the lens apparatus includes:
a first operating member rotatable around an optical axis of an optical element so as to move the optical element in an optical-axis direction;
a first elastic member configured to press the first operating member;
a second elastic member configured to press the first operating member;
a second operating member rotatable around the optical axis; and
a first interposition provided between the first operating member and the second operating member,
wherein when the second operating member is rotated around the optical axis, the first interposition is moved in the optical-axis direction without rotating around the optical axis and presses the first elastic member and the second elastic member.

* * * * *